(12) United States Patent
Shmueli-Scheuer et al.

(10) Patent No.: US 10,777,191 B2
(45) Date of Patent: Sep. 15, 2020

(54) VISUALLY EXPLORING AND PRIORITIZING DISCORDANT CONVERSATIONS WITH CONVERSATIONAL BOTS

(71) Applicant: International Business Machines Corporation, Armonk, NY (US)

(72) Inventors: Michal Shmueli-Scheuer, Tel Aviv (IL); Ora Peled Nakash, Ramat David (IL); Tommy Sandbank, Herzliyya (IL); David Konopnicki, Haifa (IL); Mordechai Taitelman, Shefayim (IL); Hen Shkedi, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 16/236,576

(22) Filed: Dec. 30, 2018

(65) Prior Publication Data

US 2020/0211536 A1    Jul. 2, 2020

(51) Int. Cl.
*G10L 15/02* (2006.01)
*G10L 17/26* (2013.01)
(Continued)

(52) U.S. Cl.
CPC ...... *G10L 15/1815* (2013.01); *G06F 16/3329* (2019.01); *G06N 5/02* (2013.01);
(Continued)

(58) Field of Classification Search
CPC .......... G10L 15/02; G10L 17/26; G06F 16/00
See application file for complete search history.

(56) References Cited

U.S. PATENT DOCUMENTS 9,508,101 B1 *  11/2016  Buchheit ............... G06Q 50/00
10,102,844 B1 *  10/2018  Mois .................. G06F 16/3329
(Continued)

OTHER PUBLICATIONS

Ryuichiro Higashinaka et al., Proposal for a dialogue breakdown detection track, DSTC6 Dialog System Technology Challenges, Long Beach, USA, Dec. 10, 2017, pp. 1-3.
(Continued)

*Primary Examiner* — Shreyans A Patel
(74) *Attorney, Agent, or Firm* — Daniel Morris; Otterstedt, Wallace & Kammer, LLP

(57) ABSTRACT

For each intent associated with a feature in a discordant conversation, one or more preceding discordant user utterances and one or more following discordant user utterances are collected. A discordant distribution over terms of the one or more preceding discordant user utterances and the one or more following discordant user utterances is created. For each intent associated with a feature in a non-discordant conversation, one or more preceding non-discordant user utterances and one or more following non-discordant user utterances are collected. A non-discordant distribution over terms of the one or more preceding non-discordant user utterances and the one or more following non-discordant user utterances is created. The discordant and non-discordant distributions are compared and the top-k terms that are most specific to user utterances associated with the corresponding discordance feature using Kullback-Leibler divergence are determined. An intent dominancy score is generated to provide an analytical view of the discordant conversation.

20 Claims, 8 Drawing Sheets

(51) Int. Cl.
*G06F 16/00* (2019.01)
*G10L 15/18* (2013.01)
*G06F 16/332* (2019.01)
*G06N 5/02* (2006.01)
*H04L 12/58* (2006.01)
*G10L 15/22* (2006.01)
*G10L 15/30* (2013.01)

(52) U.S. Cl.
CPC ............. *G10L 15/22* (2013.01); *G10L 15/30* (2013.01); *H04L 51/02* (2013.01); *H04L 51/26* (2013.01); *G10L 2015/223* (2013.01)

(56) References Cited

U.S. PATENT DOCUMENTS

| | | | | |
|---|---|---|---|---|
| 2013/0339457 | A1* | 12/2013 | Freire | H04L 51/32 709/206 |
| 2014/0207441 | A1* | 7/2014 | Larcheveque | G06F 40/30 704/9 |
| 2015/0088906 | A1* | 3/2015 | Pal | G06Q 50/01 707/749 |
| 2017/0116177 | A1* | 4/2017 | Walia | G06F 40/35 |
| 2018/0075366 | A1* | 3/2018 | Dole | G06F 16/3329 |
| 2018/0137855 | A1* | 5/2018 | Lee | G10L 15/063 |
| 2019/0138647 | A1* | 5/2019 | Kumar | G06F 40/35 |
| 2019/0163691 | A1* | 5/2019 | Brunet | G06N 5/04 |

OTHER PUBLICATIONS

Tommy Sandbank et al., Detecting Egregious Conversations between Customers and Virtual Agents. arXiv preprint arXiv:1711.05780. Nov. 15, 2017, pp. 1-10.

Verbeek, Kevin. "Necklace maps." IEEE Transactions on Visualization and Computer Graphics 16.6 (2010): p. 881-889.

Peter Mell and Timothy Grance, The NIST Definition of Cloud Computing, NIST Special Publication 800-145, Sep. 2011, cover, pp. i-iii, pp. 1-3.

Shmueli-Scheuer M, Sandbank T, Konopnicki D, Nakash OP. Exploring the Universe of Egregious Conversations in Chatbots. InProceedings of the 23rd International Conference on Intelligent User Interfaces Companion Mar. 5, 2018 (p. 16). ACM. (Abstract only pp. 1-2).

Shmueli-Scheuer M, Sandbank T, Konopnicki D, Nakash OP. Exploring the Universe of Egregious Conversations in Chatbots. InProceedings of the 23rd International Conference on Intelligent User Interfaces Companion Mar. 5, 2018 (p. 16, 2 pages). ACM. (Full Paper Grace Period Disclosure).

* cited by examiner

VISUALLY EXPLORING AND PRIORITIZING DISCORDANT CONVERSATIONS WITH CONVERSATIONAL BOTS

BACKGROUND

The present invention relates to the electrical, electronic and computer arts, and more specifically, to conversations generated by conversational bots.

Conversational bots are becoming ubiquitous in business applications, social media, and the like. Identifying problems in conversational bots quickly and consistently is pertinent to the development and general acceptance of such bots. This is especially true given the variety of types of conversations that can be encountered. Discordant conversations, for example, are relatively rare (around 8% of conversations), but the detection of such problematic conversations in bots often proves difficult. For example, a number of previous efforts have focused on the task of dialogue breakdown detection, where an utterance by the bot that leads to dialogue breakdown, and a situation where the conversation with a user cannot proceed, is detected. These efforts do not necessarily address the exploration, visualization, and improvement of bot conversations, or the analysis and integration of emotions in bot conversations.

SUMMARY

Principles of the invention provide techniques for visually exploring and prioritizing discordant conversations with conversational bots. In one aspect, an exemplary method includes the steps of collecting, for each intent i associated with a feature f in a discordant conversation, one or more preceding discordant user utterances and one or more following discordant user utterances; creating a discordant distribution over terms of the one or more preceding discordant user utterances and the one or more following discordant user utterances; collecting, for each intent i associated with a feature f in a non-discordant conversation, one or more preceding non-discordant user utterances and one or more following non-discordant user utterances; creating a non-discordant distribution over terms of the one or more preceding non-discordant user utterances and the one or more following non-discordant user utterances; comparing the discordant and non-discordant distributions and determining the top-k terms that are most specific to user utterances associated with the corresponding discordance feature using Kullback-Leibler divergence; determining an intent dominancy that indicates a rank of the intents i by order of importance; and generating scalable content to provide an analytical view of the discordant conversation based on the discordant distribution, the non-discordant distribution, and the intent dominancy.

In one example embodiment, an apparatus comprises a memory; and at least one processor, coupled to the memory, and operative to perform operations comprising: collecting, for each intent i associated with a feature f in a discordant conversation, one or more preceding discordant user utterances and one or more following discordant user utterances; creating a discordant distribution over terms of the one or more preceding discordant user utterances and the one or more following discordant user utterances; collecting, for each intent i associated with a feature f in a non-discordant conversation, one or more preceding non-discordant user utterances and one or more following non-discordant user utterances; creating a non-discordant distribution over terms of the one or more preceding non-discordant user utterances and the one or more following non-discordant user utterances; comparing the discordant and non-discordant distributions and determining the top-k terms that are most specific to user utterances associated with the corresponding discordance feature using Kullback-Leibler divergence; determining an intent dominancy score that indicates a rank of the intents i by order of importance; and generating scalable content to provide an analytical view of the discordant conversation based on the discordant distribution, the non-discordant distribution, and the intent dominancy score.

In one example embodiment, a non-transitory computer readable medium comprising computer executable instructions which when executed by a computer cause the computer to perform operations comprising: collecting, for each intent i associated with a feature f in a discordant conversation, one or more preceding discordant user utterances and one or more following discordant user utterances; creating a discordant distribution over terms of the one or more preceding discordant user utterances and the one or more following discordant user utterances; collecting, for each intent i associated with a feature f in a non-discordant conversation, one or more preceding non-discordant user utterances and one or more following non-discordant user utterances; creating a non-discordant distribution over terms of the one or more preceding non-discordant user utterances and the one or more following non-discordant user utterances; comparing the discordant and non-discordant distributions and determining the top-k terms that are most specific to user utterances associated with the corresponding discordance feature using Kullback-Leibler divergence; determining an intent dominancy score that indicates a rank of the intents i by order of importance; and generating scalable content to provide an analytical view of the discordant conversation based on the discordant distribution, the non-discordant distribution, and the intent dominancy score.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

methods for the generation of a textual and quantitative analysis over the intents of a bot conversation;

methods for exploring and prioritizing discordant conversations in a visual way;

an interactive interface that allows a designer to explore top priority items of bot conversations based on their terms and intent;

methods for combining textual and quantitative data to prioritize failure points in bot conversations; and methods for generating scalable content to support a usable view and reduce cognitive load while exploring discordant conversations.

These and other features and advantages of the present invention will become apparent from the following detailed description of illustrative embodiments thereof, which is to be read in connection with the accompanying drawings.

DETAILED DESCRIPTION

Figure 1:
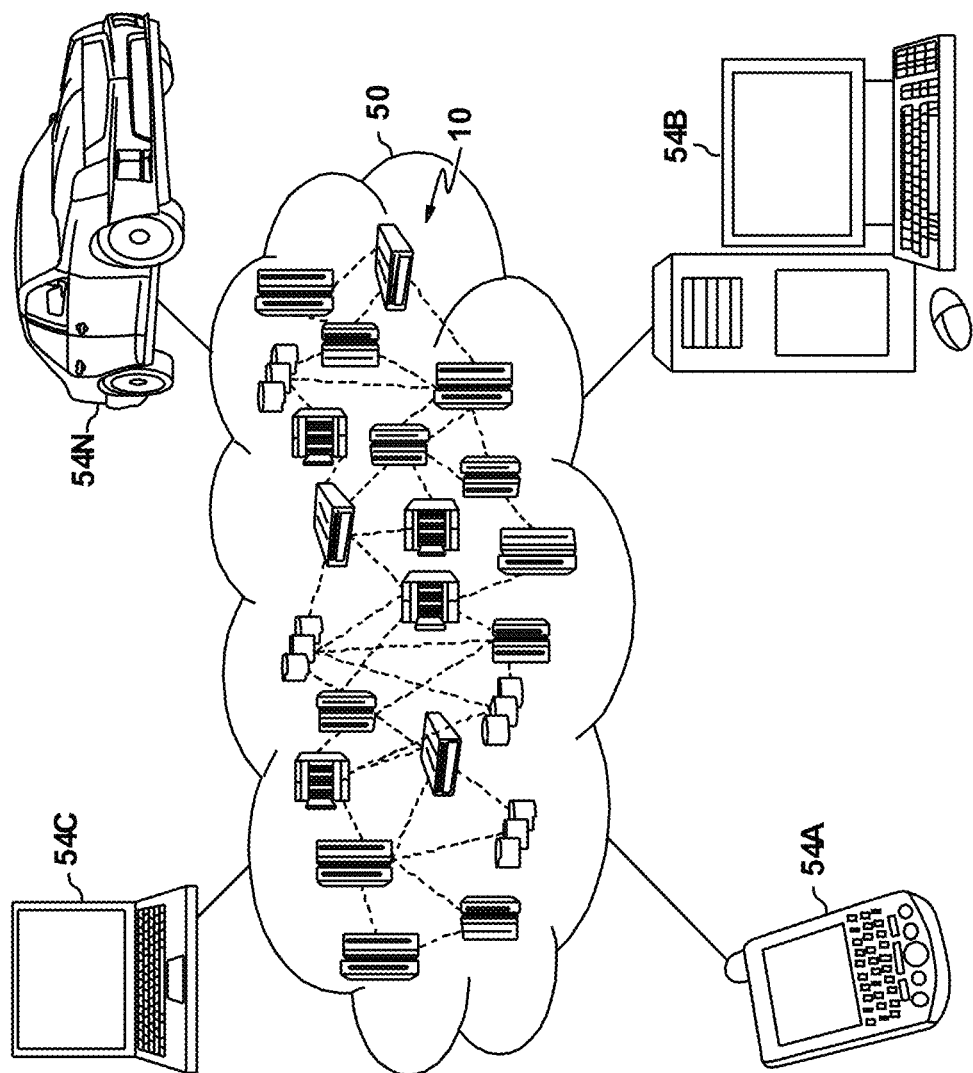
FIG. 1 depicts a cloud computing environment according to an embodiment of the present invention.

Generally, systems and methods for visually exploring, prioritizing, and improving bot conversations are disclosed. A visual interface for exploring and prioritizing failures that lead to discordant conversations is generated based on textual (terms) and quantitative (dominancy) processing and data visualization. In one or more embodiments, a pipeline starts with textual and quantitative analysis of intents, followed by visual encoding of the analysis (such as text analysis); discordant conversations and the dialog failure points that lead to these problematic dialogs are detected and mitigated; and/or a method generates and presents an overview of identified failure points that need to be addressed to a chatbot designer.

Non-limiting examples of discordant conversations are those that might be characterized as "egregious" or "problematic."

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
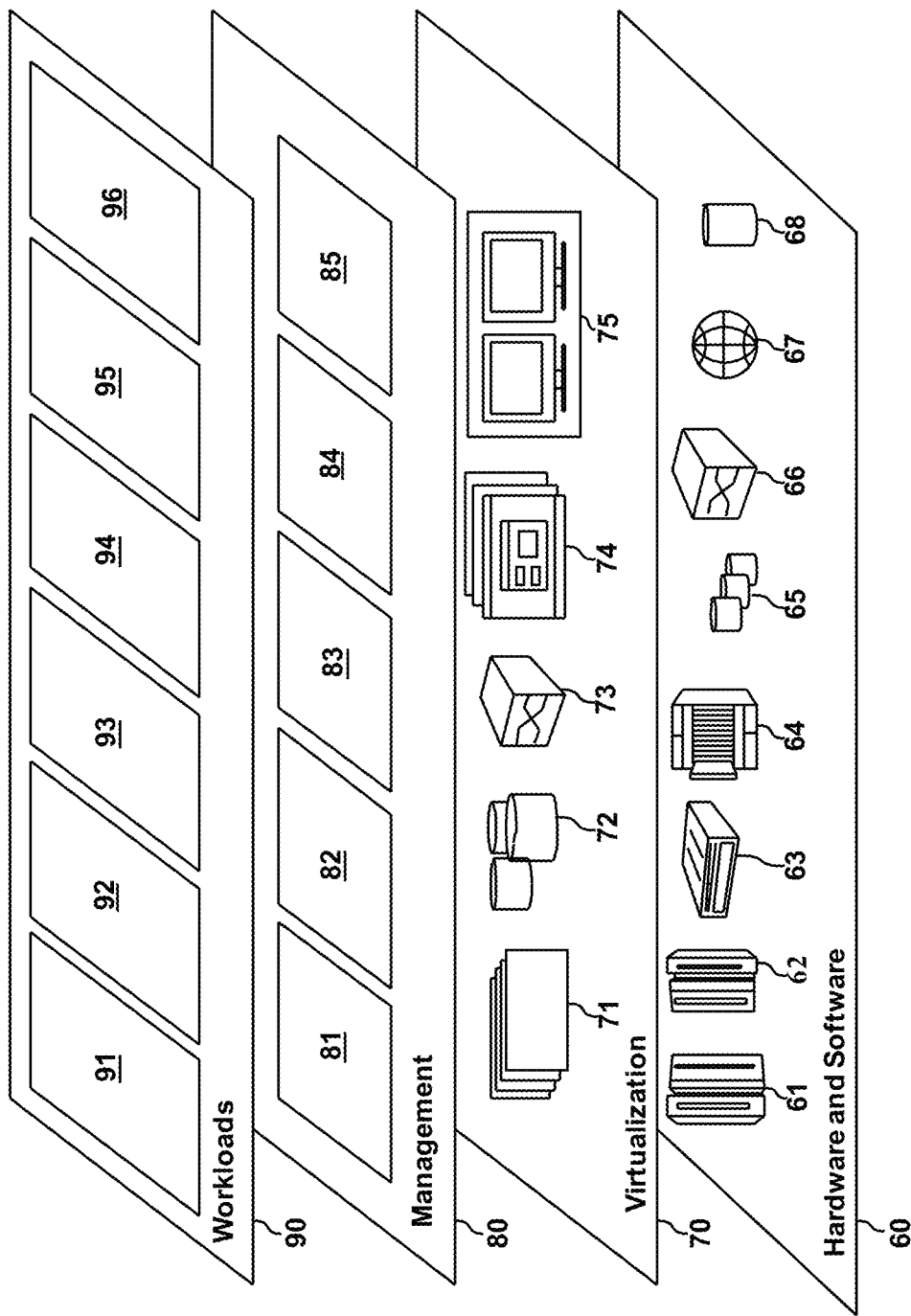
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a service 96 for visually exploring and prioritizing discordant conversations with conversational bots.

Figure 3:
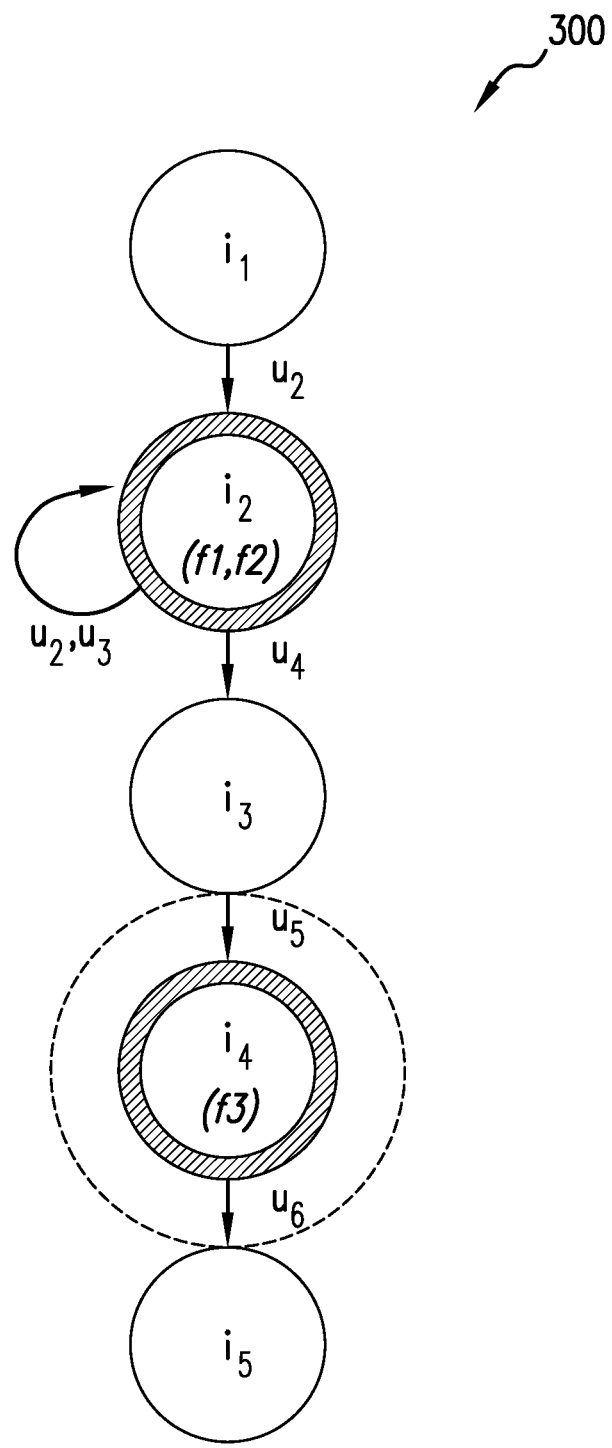
FIG. 3 is an example directed graph representing a chat of a user with a chatbot system, in accordance with an example embodiment.

In general, chatbot systems are designed using the concept of a directed graph. FIG. 3 is an example directed graph 300 representing a chat of a user with a chatbot system, in accordance with an example embodiment. Graph nodes represent different user intents i and the corresponding responses from the system. Edges represent the transitions between the intents, such as user utterances u. The output of a discordant classifier is a list of intents and, for each intent, its discordant features score. For example, the conversation depicted in FIG. 3 has seven steps and five intents, and was classified discordant due to intents $i_2$ and $i_4$. Intent $i_2$ included features f1 (user rephrasing) and f2 (agent repetition). Intent $i_4$ included feature f3 (high emotion) due to user utterance $u_6$. The same intents together with the various discordance features appear in other discordant conversations.

Figure 4:
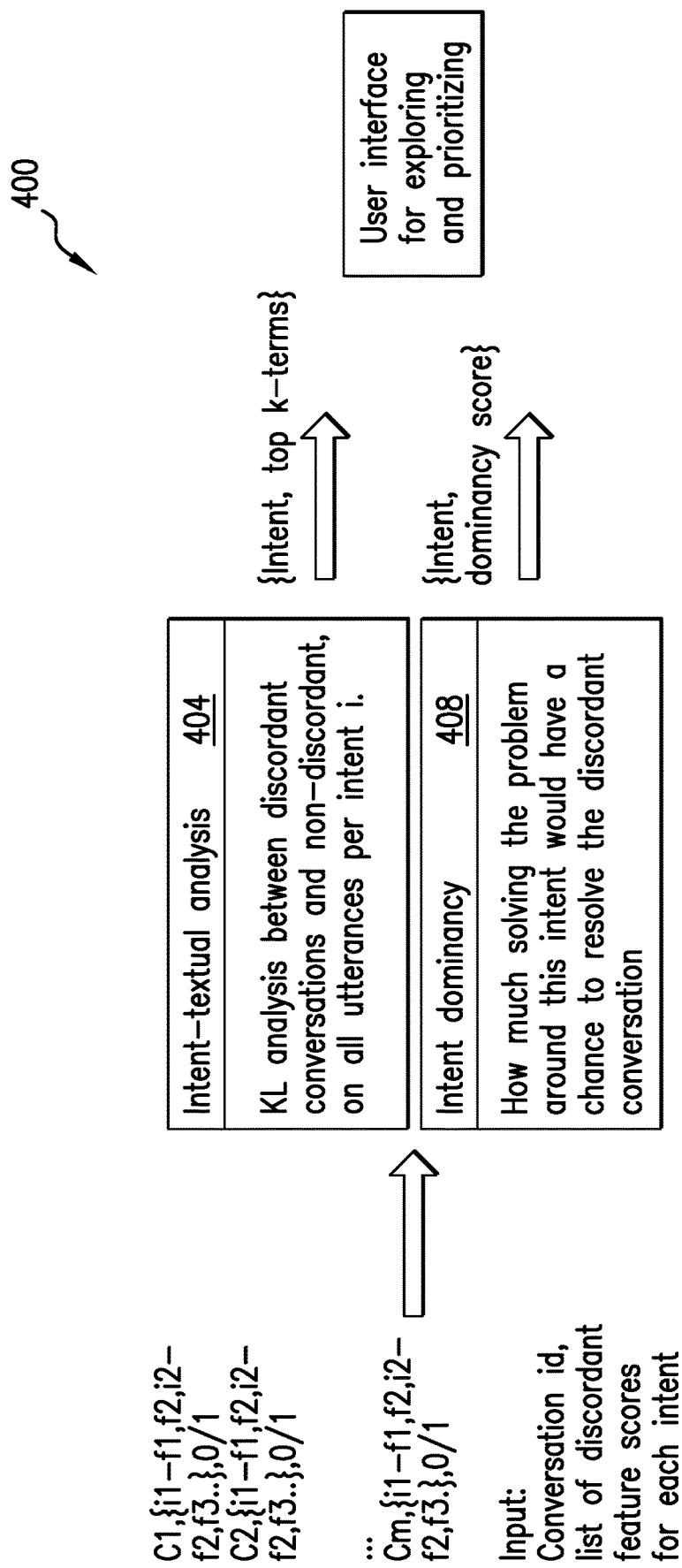
FIG. 4 is an example workflow for prioritizing discordant conversations generated by a chatbot system, in accordance with an example embodiment.

FIG. 4 is an example workflow 400 for prioritizing discordant conversations generated by a chatbot system, in accordance with an example embodiment. In one example embodiment, for each discordant conversation Cx and for each intent i associated with feature f in the discordant conversation, the preceding and following user utterances are collected, and a distribution over the terms of those utterances is created using intent-textual analysis (operation 404). For each intent i, the preceding and following user utterances in the non-discordant conversations are collected, and a distribution over those terms is created using intent-textual analysis (operation 404). In one example embodiment, the distribution is each term's, or a subset of the terms, term frequency-inverse document frequency (TF-IDF) (for the collection of all the discordant conversations, calculate their terms TF-IDF; similarly, do this distribution to non-discordant conversations in the other collection—the inputs for FIG. 4 are: conversation ID; and for each intent, the list of discordant feature scores that were detected). Kullback-Leibler divergence is used to compare the distributions and to obtain the top-k terms that are the most specific to the user's utterances associated with the corresponding discordance feature. For example, for intent "information store location" in the discordant conversations, two features were recognized:

rephrasing—"store open hours" (users do a lot of rephrasing to access this information; a remedy could be adding a new intent);

high emotions— "cannot find" (many users get emotional when they cannot find the store they are looking for; a remedy could be to add an empathy expression to the response.)

In one example embodiment, an intent dominancy score (a quantitative value) that indicates which intents should be handled first in order to have a better chance of resolving failure point(s) of the discordant conversation is determined (operation 408). In one example embodiment, the intent dominancy score is determined per conversation by computing the ratio of the number of appearances of the corresponding intent to the total number of discordant intents, and then averaging the ratio across all conversations. A conversation can be classified as discordant due to different features appearing in different intents. In one example embodiment, the intent dominancy score varies between zero and one. In one example embodiment, the top-k terms and dominancy score are made available for exploring and prioritizing conversations via a user interface 410.

Figure 5:
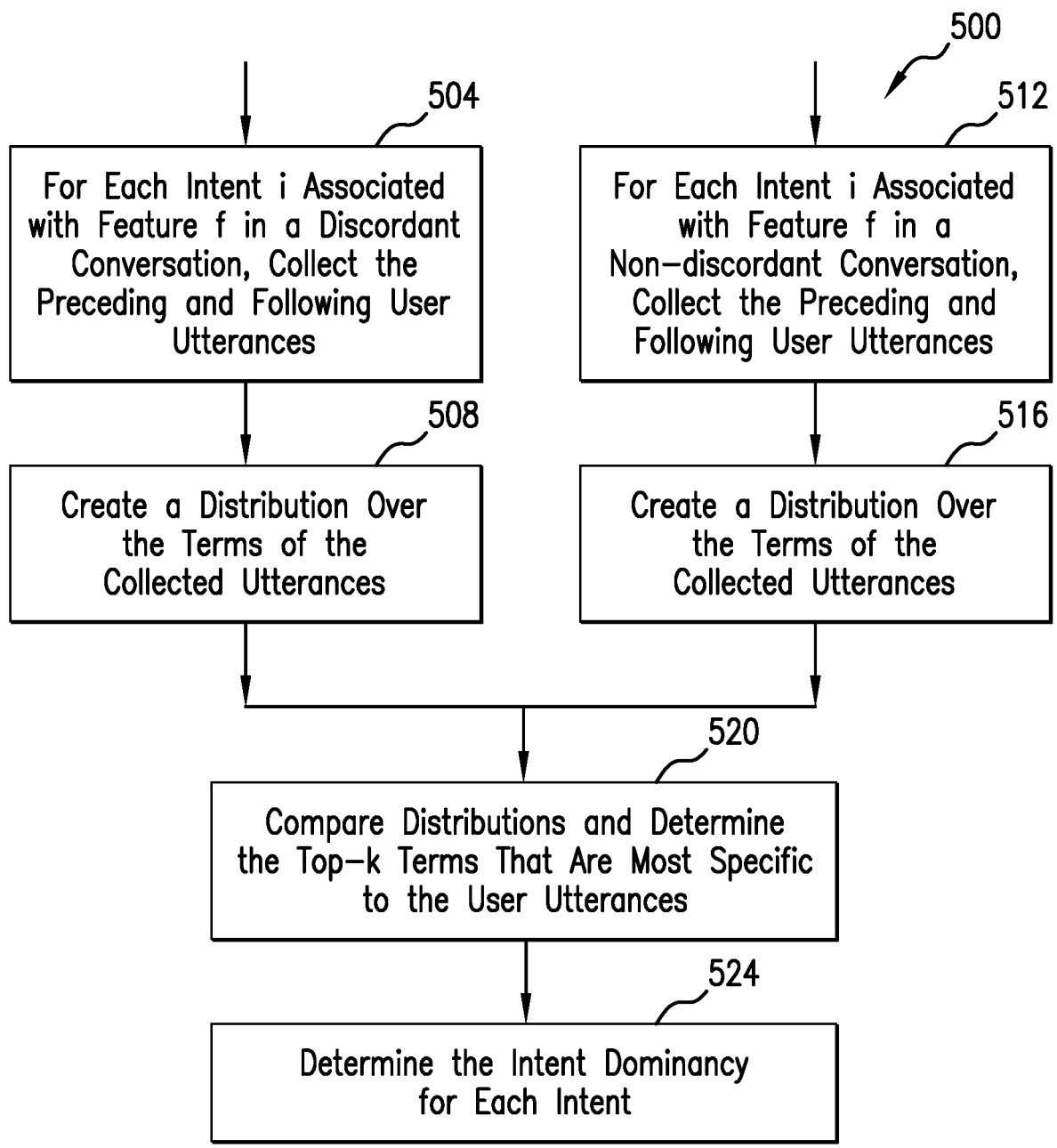
FIG. 5 is a flowchart of an example method for prioritizing failure points in discordant conversations generated by a bot, in accordance with an example embodiment.

FIG. 5 is a flowchart of an example method 500 for prioritizing failure points in discordant conversations generated by a bot, in accordance with an example embodiment. In one example embodiment, for each intent i associated with feature f in a discordant conversation, the preceding and following user utterances are collected (operation 504) and a distribution over the terms of those utterances is created (operation 508). For each intent i, the preceding and following user utterances in a non-discordant conversations are collected (operation 512) and a distribution over those terms is created (operation 516). The distributions are compared and the top-k terms that are the most specific to the user's utterances associated with the corresponding discordance feature are determined by comparing them using Kullback-Leibler (KL) divergence (operation 520)—in one or more embodiments, the input for KL is two normalized distributions. An intent dominancy that indicates which intents should be handled first is determined (operation 524). As described above, an intent is considered dominant if, in all the discordant conversations that it is a component of, there are very few other discordant intents (the skilled artisan, given the teachings herein, will be able to determine dominance under specific conditions). In one example embodiment, the intent dominancy is determined for each intent. In one example embodiment, the intent dominancy is determined for a subset of the intents. In one example embodiment, the intents are then processed in an order based on the intent dominancy.

Operations 512, 516 are, in one or more embodiments, parallel to 504, 508; they are the input to 520.

Figure 6A:
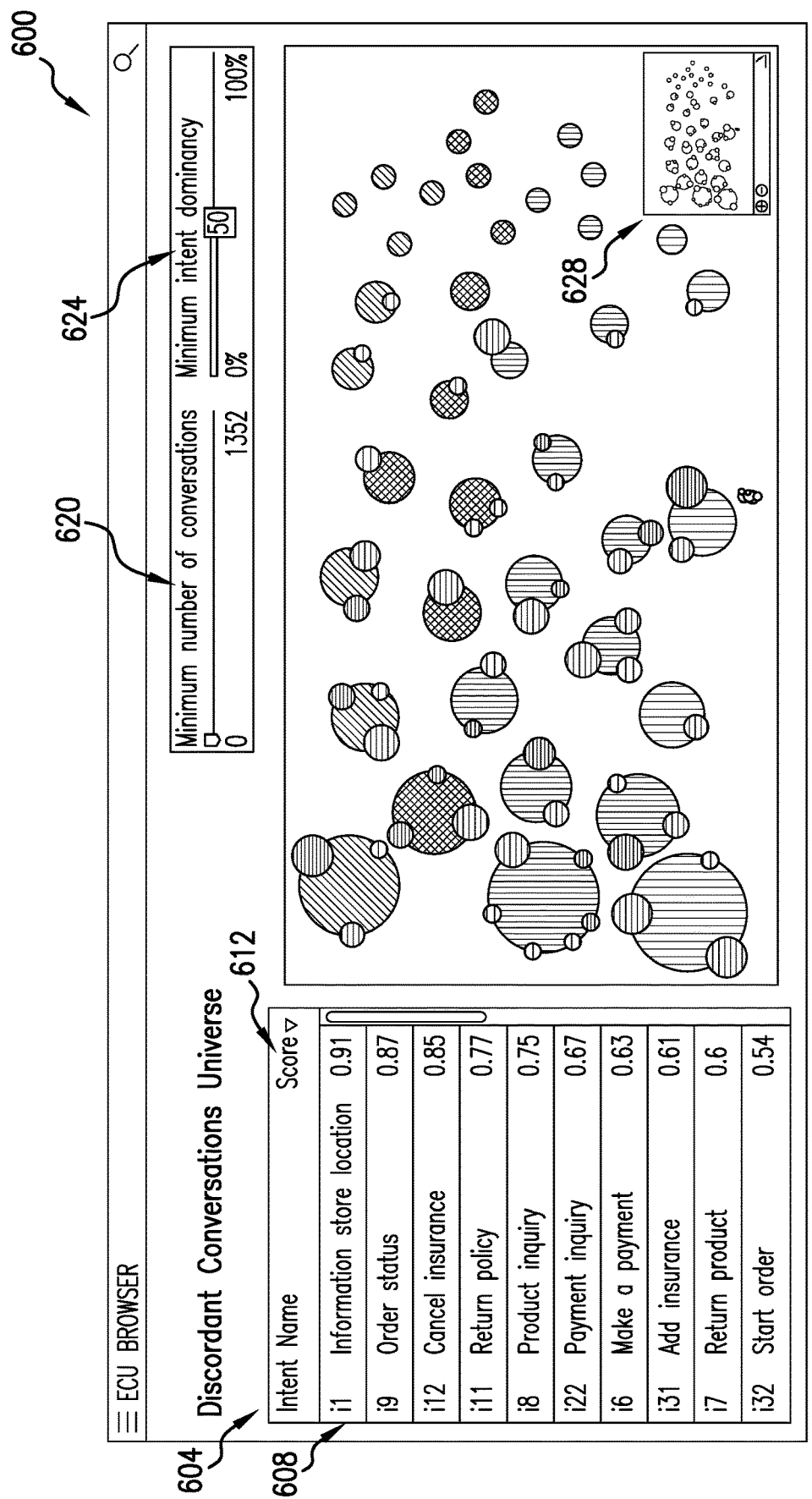
FIGS. 6A and 6B are illustrations of an example user interface that allows visual exploration of terms and intents related to a conversation generated by a bot, in accordance with an example embodiment.
Figure 6B:
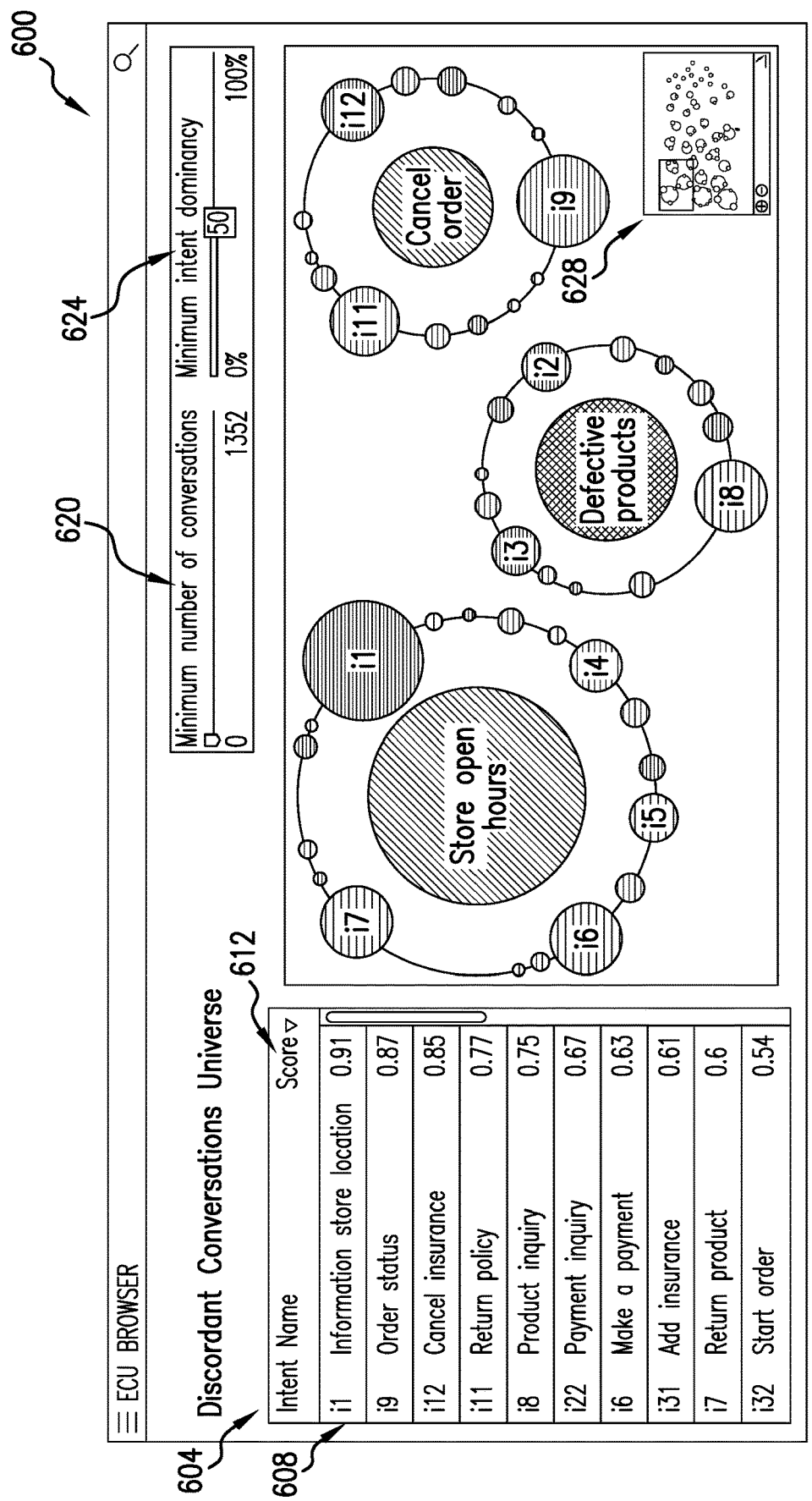

FIGS. 6A and 6B are illustrations of an example user interface 600 that allows visual exploration of terms and intents related to a conversation generated by a bot, in accordance with an example embodiment. In one example embodiment, a dual view is presented: one in which the graphical "suns" are terms and the graphical "planets" are intents, and one in which the graphical "suns" are intents and the graphical "planets" the terms. An intent list 604 displays an intent name 608 and an intent importance score 612 for each intent. Importance score is calculated by considering the intent dominancy and its frequency. Each term and intent is represented by a node (a circle); the fill pattern (e.g. type of cross-hatching or color) indicates the node type: term or intent per term. The size of the circle corresponds to the number of conversations associated with the term or intent and the density of the fill pattern (e.g. density of cross-hatching or color saturation) corresponds to the dominancy of the term or intent. For example, different amounts of color saturation in blue and orange could be used, or blue could be replaced by horizontal cross-hatching with denser hatching corresponding to greater color saturation and orange could be replaced by double hatching of dashed lines at plus or minus 45 degrees, again with denser hatching corresponding to greater color saturation. Entities are ordered in two axes to help visual orientation: from "big" to "small" on the x-axis (where the size corresponds to the count of conversations) and from "hot" to "cold" on the y-axis (where a higher temperature indicates a higher dominancy).

In one or more embodiments, the universal map allows navigation in a full view, while zooming into specific elements.

A conversation count slide bar 620 adjusts a threshold for the minimum number of conversations (where only the "suns" having a conversation count that equals or exceeds the threshold are displayed) and an intent slide bar 624 adjusts a threshold for the minimum intent dominancy (where only the "planets" having an intent dominancy that equals or exceeds the threshold are displayed). A universal map 628 shows a view of the entire universe of terms and intents. In one example embodiment, all nodes are non-occluding to each other or to related nodes, as illustrated in FIG. 6B.

Given the discussion thus far, it will be appreciated that, in general terms, an exemplary method, according to an aspect of the invention, includes the step of collecting, for each intent i 300 associated with a feature f in a discordant conversation, one or more preceding discordant user utterances and one or more following discordant user utterances 504; creating a discordant distribution over terms of the one or more preceding discordant user utterances and the one or more following discordant user utterances 508; collecting, for each intent i associated with a feature f in a non-discordant conversation, one or more preceding non-discordant user utterances and one or more following non-discordant user utterances 512; creating a non-discordant distribution over terms of the one or more preceding non-discordant user utterances and the one or more following non-discordant user utterances 516; comparing the discordant and non-discordant distributions and determining the top-k terms that are most specific to user utterances associated with the corresponding discordance feature using Kullback-Leibler divergence 520; determining an intent dominancy score that indicates a rank of the intents i by order of importance; and generating scalable content to provide an analytical view of the discordant conversation based on the discordant distribution, the non-discordant distribution, and the intent dominancy score 524.

In one example embodiment, the operations further comprise generating a user interface 600 based on the discordant and non-discordant distributions and the intent dominancy score 408, 612. In one example embodiment, the operations further comprise processing the intents i 300 according to a ranking of intent dominancy 408, 612.

In one example embodiment, a candidate intent 300 is considered dominant if, in all the discordant conversations that it is a component of, there are very few other discordant intents. In one example embodiment, the user interface 600 represents one or more terms and one or more intents with graphical suns and graphical planets, and displays an intent dominancy score 612 for each intent. In one example embodiment, a size of a circle corresponds to a count of conversations and a color saturation corresponds to a dominancy of the corresponding term or intent. In one example embodiment, a conversation count slide bar 620 adjusts a minimum count of conversations and an intent slide bar 624 adjusts a threshold for a minimum intent dominancy score that indicates a minimum intent dominancy score for intents being displayed.

In one example embodiment, the discordant distribution and the non-discordant distribution is a term frequency-inverse document frequency of each term. In one example embodiment, the intent dominancy score 408, 612 is determined per conversation by computing a ratio of a number of appearances of an intent 300 to a total number of discordant intents, and averaging the ratio across all conversations.

In one example embodiment, an apparatus comprises a memory 28; and at least one processor 16, coupled to the memory, and operative to perform operations comprising: collecting, for each intent i 300 associated with a feature f in a discordant conversation, one or more preceding discordant user utterances and one or more following discordant user utterances 504; creating a discordant distribution over terms of the one or more preceding discordant user utterances and the one or more following discordant user utterances 508; collecting, for each intent i associated with a feature f in a non-discordant conversation, one or more preceding non-discordant user utterances and one or more following non-discordant user utterances 512; creating a non-discordant distribution over terms of the one or more preceding non-discordant user utterances and the one or more following non-discordant user utterances 516; comparing the discordant and non-discordant distributions and determining the top-k terms that are most specific to user utterances associated with the corresponding discordance feature using Kullback-Leibler divergence 520; determining an intent dominancy score that indicates a rank of the intents i by order of importance; and generating scalable content to provide an analytical view of the discordant conversation based on the discordant distribution, the non-discordant distribution, and the intent dominancy score 524.

In one example embodiment, a non-transitory computer readable medium comprising computer executable instructions which when executed by a computer cause the computer to perform operations comprising: collecting, for each intent i associated with a feature f in a discordant conversation, one or more preceding discordant user utterances and one or more following discordant user utterances 504; creating a discordant distribution over terms of the one or more preceding discordant user utterances and the one or more following discordant user utterances 508; collecting, for each intent i associated with a feature f in a non-discordant conversation, one or more preceding non-discordant user utterances and one or more following non-discordant user utterances 512; creating a non-discordant distribution over terms of the one or more preceding non-discordant user utterances and the one or more following non-discordant user utterances 516; comparing the discordant and non-discordant distributions and determining the top-k terms that are most specific to user utterances associated with the corresponding discordance feature using Kullback-Leibler divergence 520; determining an intent dominancy score that indicates a rank of the intents i by order of importance; and generating scalable content to provide an analytical view of the discordant conversation based on the discordant distribution, the non-discordant distribution, and the intent dominancy score 524.

Figure 7:
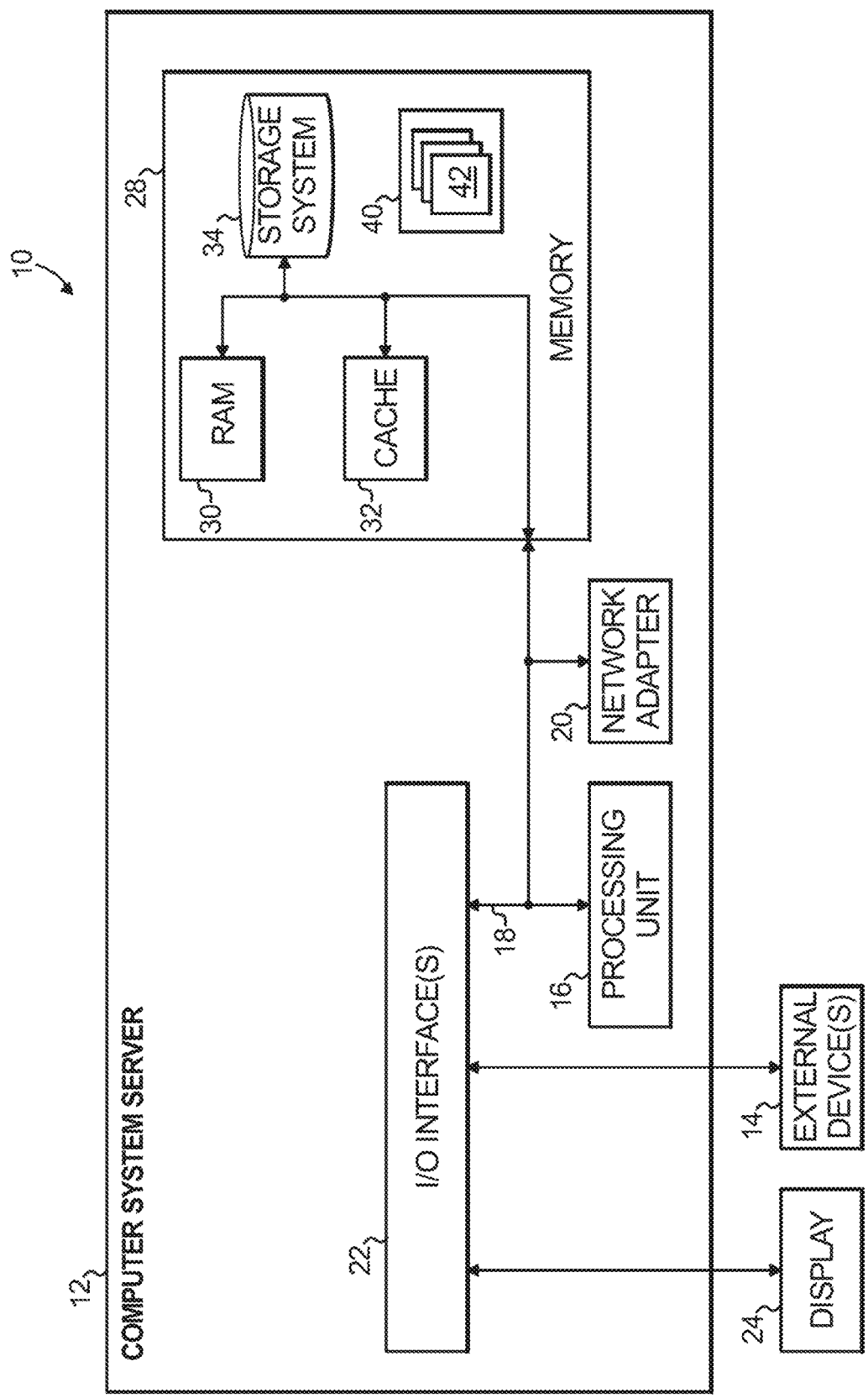
FIG. 7 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   collecting, for each intent associated with a feature in a discordant conversation, one or more preceding discordant user utterances and one or more following discordant user utterances;
   creating a discordant distribution over terms of the one or more preceding discordant user utterances and the one or more following discordant user utterances;
   collecting, for each intent associated with a feature in a non-discordant conversation, one or more preceding non-discordant user utterances and one or more following non-discordant user utterances;
   creating a non-discordant distribution over terms of the one or more preceding non-discordant user utterances and the one or more following non-discordant user utterances;
   comparing the discordant and non-discordant distributions and determining top-k terms that are most specific to user utterances associated with the corresponding discordance feature using Kullback-Leibler divergence;
   determining an intent dominancy score that indicates a rank of the intents by order of importance; and
   generating scalable content to provide an analytical view of the discordant conversation based on the discordant distribution, the non-discordant distribution, and the intent dominancy score.

2. The method of claim 1, further comprising generating a user interface based on the discordant and non-discordant distributions and the intent dominancy score.

3. The method of claim 2, wherein the user interface represents one or more terms and one or more intents with graphical suns and graphical planets, and displays an intent dominancy score for each intent.

4. The method of claim 3, wherein a size of a circle corresponds to a count of conversations and a color saturation corresponds to a dominancy of the corresponding term or intent.

5. The method of claim 3, wherein a conversation count slide bar adjusts a minimum count of conversations and an intent slide bar adjusts a threshold for a minimum intent dominancy score that indicates a minimum intent dominancy score for intents being displayed.

6. The method of claim 1, wherein the discordant distribution and the non-discordant distribution is a term frequency-inverse document frequency of each term.

7. The method of claim 1, wherein the intent dominancy score is determined per conversation by computing a ratio of a number of appearances of an intent to a total number of discordant intents, and averaging the ratio across all conversations.

8. The method of claim 1, further comprising processing the intents according to a ranking of intent dominancy.

9. An apparatus comprising:
   a memory; and
   at least one processor, coupled to said memory, and operative to perform operations comprising:
   collecting, for each intent associated with a feature in a discordant conversation, one or more preceding discordant user utterances and one or more following discordant user utterances;
   creating a discordant distribution over terms of the one or more preceding discordant user utterances and the one or more following discordant user utterances;
   collecting, for each intent associated with a feature in a non-discordant conversation, one or more preceding non-discordant user utterances and one or more following non-discordant user utterances;
   creating a non-discordant distribution over terms of the one or more preceding non-discordant user utterances and the one or more following non-discordant user utterances;
   comparing the discordant and non-discordant distributions and determining top-k terms that are most specific to user utterances associated with the corresponding discordance feature using Kullback-Leibler divergence;
   determining an intent dominancy score that indicates a rank of the intents by order of importance; and
   generating scalable content to provide an analytical view of the discordant conversation based on the discordant distribution, the non-discordant distribution, and the intent dominancy score.

10. The apparatus of claim 9, the operations further comprising generating a user interface based on the discordant and non-discordant distributions and the intent dominancy score.

11. The apparatus of claim 10, wherein the user interface represents one or more terms and one or more intents with graphical suns and graphical planets, and displays an intent dominancy score for each intent.

12. The apparatus of claim 11, wherein a size of a circle corresponds to a count of conversations and a color saturation corresponds to a dominancy of the corresponding term or intent.

13. The apparatus of claim 11, wherein a conversation count slide bar adjusts a minimum count of conversations and an intent slide bar adjusts a threshold for a minimum intent dominancy score that indicates a minimum intent dominancy score for intents being displayed.

14. The apparatus of claim 9, wherein the discordant distribution and the non-discordant distribution is a term frequency-inverse document frequency of each term.

15. The apparatus of claim 9, wherein the intent dominancy score is determined per conversation by computing a ratio of a number of appearances of an intent to a total number of discordant intents, and averaging the ratio across all conversations.

16. The apparatus of claim 9, the operations further comprising processing the intents i according to a ranking of intent dominancy.

17. A non-transitory computer readable medium comprising computer executable instructions which when executed by a computer cause the computer to perform operations comprising:
   collecting, for each intent associated with a feature in a discordant conversation, one or more preceding discordant user utterances and one or more following discordant user utterances;

creating a discordant distribution over terms of the one or more preceding discordant user utterances and the one or more following discordant user utterances;

collecting, for each intent associated with a feature in a non-discordant conversation, one or more preceding non-discordant user utterances and one or more following non-discordant user utterances;

creating a non-discordant distribution over terms of the one or more preceding non-discordant user utterances and the one or more following non-discordant user utterances;

comparing the discordant and non-discordant distributions and determining top-k terms that are most specific to user utterances associated with the corresponding discordance feature using Kullback-Leibler divergence;

determining an intent dominancy score that indicates a rank of the intents i by order of importance; and generating scalable content to provide an analytical view of the discordant conversation based on the discordant distribution, the non-discordant distribution, and the intent dominancy score.

18. The apparatus of claim 17, the operations further comprising generating a user interface based on the discordant and non-discordant distributions and the intent dominancy score.

19. The apparatus of claim 17, wherein the intent dominancy score is determined per conversation by computing a ratio of a number of appearances of an intent to a total number of discordant intents, and averaging the ratio across all conversations.

20. The apparatus of claim 17, the operations further comprising processing the intents i according to a ranking of intent dominancy.

* * * * *